United States Patent [19]
Tanaka

[11] Patent Number: 5,509,084
[45] Date of Patent: Apr. 16, 1996

[54] METHOD AND APPARATUS FOR POSTPROCESSING MEDICAL IMAGES

[75] Inventor: Yuko Tanaka, Ujiie, Japan

[73] Assignee: Kabushiki Kaisha Toshiba, Kawasaki, Japan

[21] Appl. No.: 247,410

[22] Filed: May 23, 1994

Related U.S. Application Data

[63] Continuation of Ser. No. 936,521, Aug. 28, 1992, abandoned.

[30]  Foreign Application Priority Data

Aug. 29, 1991  [JP]  Japan .................................. 3-218686

[51] Int. Cl.$^6$ ......................................................... G06K 9/00
[52] U.S. Cl. ......................... 382/128; 382/171; 382/173; 364/413.13
[58] Field of Search ................................. 382/6, 18, 170, 382/171, 172, 173, 128, 131; 364/413.17, 413.19, 413.22, 413.13

[56]  References Cited

U.S. PATENT DOCUMENTS

| | | | |
|---|---|---|---|
| 4,642,621 | 2/1987 | Nemoto et al. | 364/413.22 |
| 4,945,478 | 7/1990 | Merickel et al. | 382/6 |
| 5,042,077 | 8/1991 | Burke | 382/6 |
| 5,185,809 | 2/1993 | Kennedy et al. | 382/6 |

OTHER PUBLICATIONS

IEEE Transactions on Medical Imaging, vol. MI–6, No. 4, Dec. 1987, pp. 370–373, Andreas Herrmann, et al., "Oscillating Intensity Display of Soft Tissue Lesions in MRI".

Radiology, vol. 169, Dec. 1988, pp. 779–785, Michael Just, et al, "Tissue Characterization with T1, T2, and Proton Density Values: Results in 160 Patients with Brain Tumors".

*Primary Examiner*—Leo Boudreau
*Assistant Examiner*—David R. Anderson
*Attorney, Agent, or Firm*—Oblon, Spivak, McClelland, Maier & Neustadt

[57]  ABSTRACT

A method and apparatus are specialized in utilizing a two dimensional histogram for designating a ROI including accurate functional information of a lesion in tissues. A pair of medical images imaged at an identical position of a patient under different imaging conditions is provided by an image providing element. Each of the images extends two-dimensionally and consists of a plurality of pixels. A two-dimensional histogram is calculated by a histogram calculating element and displayed by a histogram displaying element. The histogram projects a function between pixel intensities of the images and frequencies of the pixel intensities. A desired region is then designated by a region designating element on the histogram displayed. Finally, pixels of the plural images equal in pixel intensities to pixels composing the desired designated region are specified by a pixel specifying element as a finally designated ROI.

35 Claims, 10 Drawing Sheets

IMAGE A(B)

METHOD AND APPARATUS FOR POSTPROCESSING MEDICAL IMAGES

This application is a continuation of application Ser. No. 07/936,521, filed on Aug. 28, 1992, now abandoned.

BACKGROUND OF THE INVENTION

The present invention relates to a postprocessing technique of medical images, and more particularly to the technique of extracting desired regions, such as lesions and organs, as ROIs (regions of interest) from tissues of an object imaged.

In acquiring valuable information on medical activities today, it is very useful to collect and analyze image data within a ROI designated on a plane image provided by various medical image diagnostic systems.

Image data from a ROI was mainly collected with a threshold value technique in the past. However, the threshold value technique referred to only the comparison between all pixel intensities and the threshold value, thus sometimes misleading to collection of image data in the outside of the ROI.

To avoid the above drawback, another technique utilizing histograms has now been in general use.

In the histogram technique for MRI(magnetic resonance technique), for example, a matched pair of images sliced at an identical slicing position of a patient is prepared. The pair of images is given under different imaging conditions or different calculation processes for raw data, and are, for instance, T1- and T2-weighted images A and B in MRI. The prepared two slicing image data are each processed with an individual threshold range to produce two individual histogram data. As a result, two extracted regions $E_A$ and $E_B$ come out and are then processed by an AND(conjunction) operation or an OR(disjunction) operation to produce a final ROI. The ROI finally produced represents a correlation of configurations between the two extracted regions $E_A$ and $E_B$ according to the two threshold ranges.

By the way, it has been suggested that images collected from a living body include not only configurative information of its tissues but functional information of them. Based on this suggestion, much research has been carried out and reference is made to the following articles:

1) ANDREAS HERRMANN, DAVID N. LEVIN, and ROBERT N. BECK, "Oscillating Intensity Display of Soft Tissue Lesions in MRI", IEEE Transactions on Medical Imaging, Vol. MI-6, No. 4, 370–373, 1987; and 2) MICHAEL JUST and MANFRED THELEN, "Tissue Characterization with T1, T2, and Proton Density Values: Results in 160 Patients with Brain Tumors", Radiology, 169, 779–785, 1988.

HERRMANN et al. discloses a technique by which soft tissues lesions can be estimated according to correlation of pixel intensities between T1- and T2-weighted images by MRI on a two-dimensional histogram (intensity plane: see FIG. 2 on page 371). Also disclosed by JUST is a technique by which tissue characterization can be made with correlation of pixel intensities among T1- and T2-weighted images and proton density images.

When reducing the results of the research to practice, it is required to delineate a ROI on a monitor. In such a case, it is impossible to utilize the above-described ROI technique for highly accurate delineation, because the conventional technique devotes its whole attention to configurative correlation between the images A and B determined by theshold ranges.

SUMMARY OF THE INVENTION

Accordingly, it is a primary object of the present invention to provide a postprocessing technique of designating easily and accurately a ROI representing functional information of tissues.

It is another object of the present invention to provide a postprocessing technique being able to designate a ROI representing functional information, even though a case is unclear.

It is still another object of the present invention to provide a postprocessing technique utilizing a two-dimensional histogram effectively.

These and other objects can be achieved according to the present invention, in one aspect by providing, an apparatus for postprocessing medical images comprising: an element for providing a plurality of medical images imaged at an identical position of an object being imaged under different imaging conditions, each of said images extending two-dimensionally and consisting of a plurality of pixels each having a pixel intensity; an element for calculating at least two dimensional histogram projecting a function between pixel intensities of said plurality of images and frequencies of the pixel intensities; an element for displaying said at least two dimensional histogram; an element for designating a desired region on the histogram displayed by said displaying element; and an element for specifying pixels of said plurality of images equal in pixel intensities to pixels composing the desired region.

In a further aspect according to the present invention, there is provided a method of postprocessing medical images comprising steps of: providing a plurality of medical images imaged at an identical position of an object being imaged under different imaging conditions, each of said images extending two-dimensionally and consisting of a plurality of pixels; calculating at least two dimensional histogram projecting a function between pixel intensities of said plurality of images and frequencies of the pixel intensities; displaying said at least two dimensional histogram; designating a desired region on the histogram displayed; and specifying pixels of said plurality of images equal in pixel intensities to pixels composing the desired region.

As a result, one can obtain widened usage of a two-dimensional histogram and designate easily and accurately a ROI representing functional information of tissues of a patient.

BRIEF DESCRIPTION OF THE DRAWINGS

The accompanying drawings which are incorporated in and constitute a part of this specification, illustrate embodiments of the present invention and, together with the description, serve to explain the principles of the present invention. In the drawings.

DESCRIPTION OF THE PREFERRED EMBODIMENTS

Embodiments of the present invention will now be described with reference to the accompanying drawings.

A first embodiment will be described according to FIGS. 1 to 8.

Figure 1:
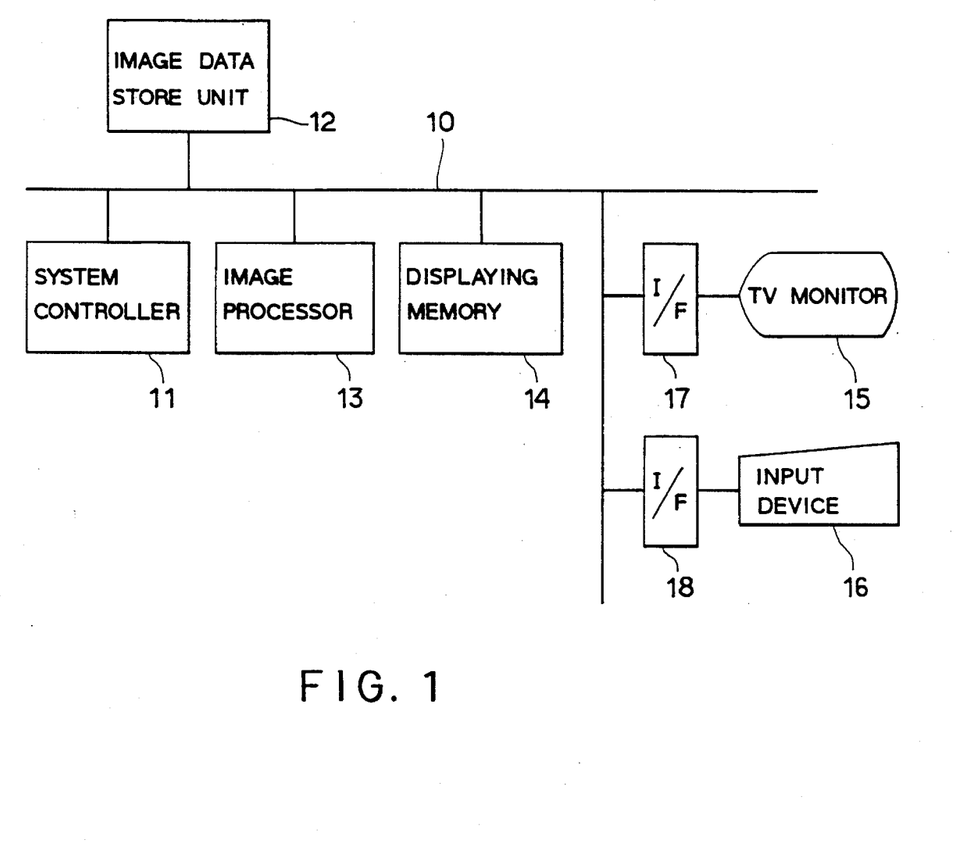
FIG. 1 represents in block form a medical image postprocessing apparatus of a first embodiment according to the present invention.

A medical image processing apparatus in FIG. 1 comprises a bus line 10 serving as a signal transmission passage, a system controller 11 electrically connected to the bus line 10, an image data store unit 12 serving as an image storing means, an image processor 13, a memory 14 for displaying an image, a TV monitor 15, and an input device 16.

The system controller 11 has a central processing unit (CPU) and work memories, and is in charge of control including timing control of the entire apparatus. The image data store unit 12 is, for instance, a magnetic disk storage being capable of storing a plurality of two-dimensional image data of many patients, the image data being transmitted through the bus line 10 from medical diagnostic systems such as an X-ray CT scanner and a magnetic resonance imaging (MRI) system. The image data thus-stored include a matched pair of data imaged at an identical slicing position of patients. The matched pair of data is, for example, a pair of T1- and T2-weighted image data at a certain slicing position of a patient in MRI. As other matched pair of data, there can also be provided a pair of scan data with/without contrast medium in X-ray CT scanning, a pair of T1-weighted image data and proton density-weighted image data or T2-weighted image data and proton density-weighted image data in MRI, and a pair of imaging data with changed contrast media in single-photon emission CT(SPECT).

The image processor 13 also has a CPU and work memories, and the CPU is to be in charge of image processing later described according to a series of procedures stored in one of the work memories. The image processor 13 is under control of the system controller 11.

The displaying memory 14 has a memory area corresponding one by one to each pixel of the TV monitor 14 for conversion of image data. The TV monitor 15, for instance, is formed by a CRT to which image data stored in the displaying memory 14 are supplied by way of an interface 17 at every certain period of time. On the other hand, the input device 16, which is for providing necessary information to this apparatus, is a mouse, track ball, tablet or key board, or a combination of them. The input device 16 is coupled by way of an interface 18 to the bus line 10.

By the way, as one of modifications to the above-described construction, the apparatus can be designed such that processing performed by the image processor 13 is included in the processing carried out by the system controller 11.

Figure 2:
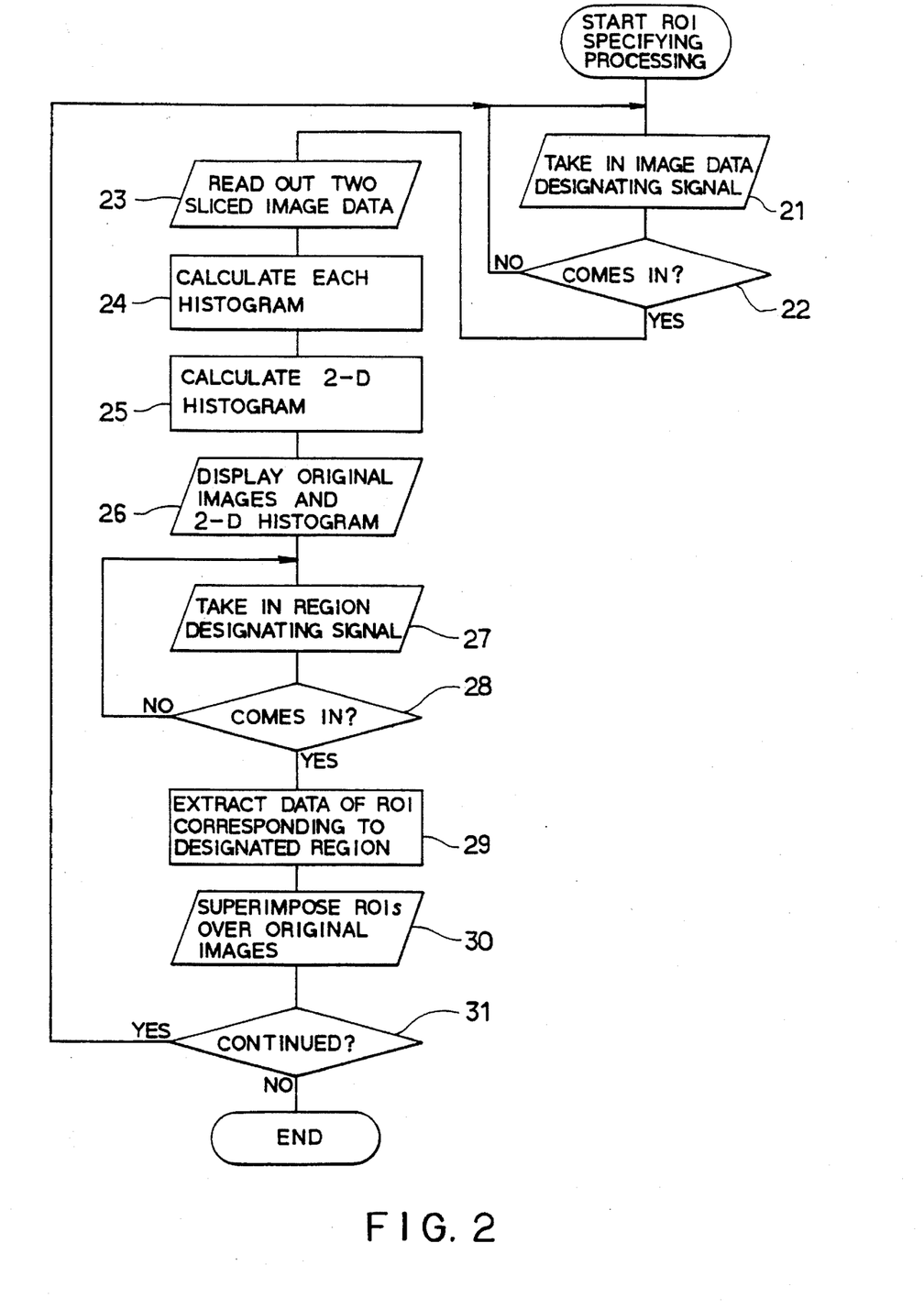
FIG. 2 represents a flowchart of ROI specifying processing.

Referring mainly to FIG. 2, the performance by the image processor 13 will be described.

When initiated by a starting command coming from the system controller 11, the image processor 13 will perform a predetermined main program for image data processing. Besides the main program, a series of procedures shown in FIG. 2 will be processed as an interrupt action by the image processor 13 in responce to a ROI designating instruction through the input device 16 from an operator. The operator means here a doctor, radiologist or technologist.

At Step 21 in FIG. 2, the image processor 13 tries to take in an image designating signal which might be supplied by way of the input device 16 from the operator. The image designating signal can designate a desired matched pair of two-dimensional images among a massive quantity of images stored in the image data store unit 12. The pair of images here is a combination of T1- and T2-weighted images collected at an identical slicing position of a patient by MRI.

Then, at Step 22, the image processor 13 judges whether or not the designating signal comes in. Hence, when judging to be NO thereat (i.e., the signal has not come in yet), the procedures at Steps 21 and 22 will be repeated. But when judging to be YES (i.e., the signal has come in), the processing then proceeds to Steps 23 to 28 one after another.

Figure 4:
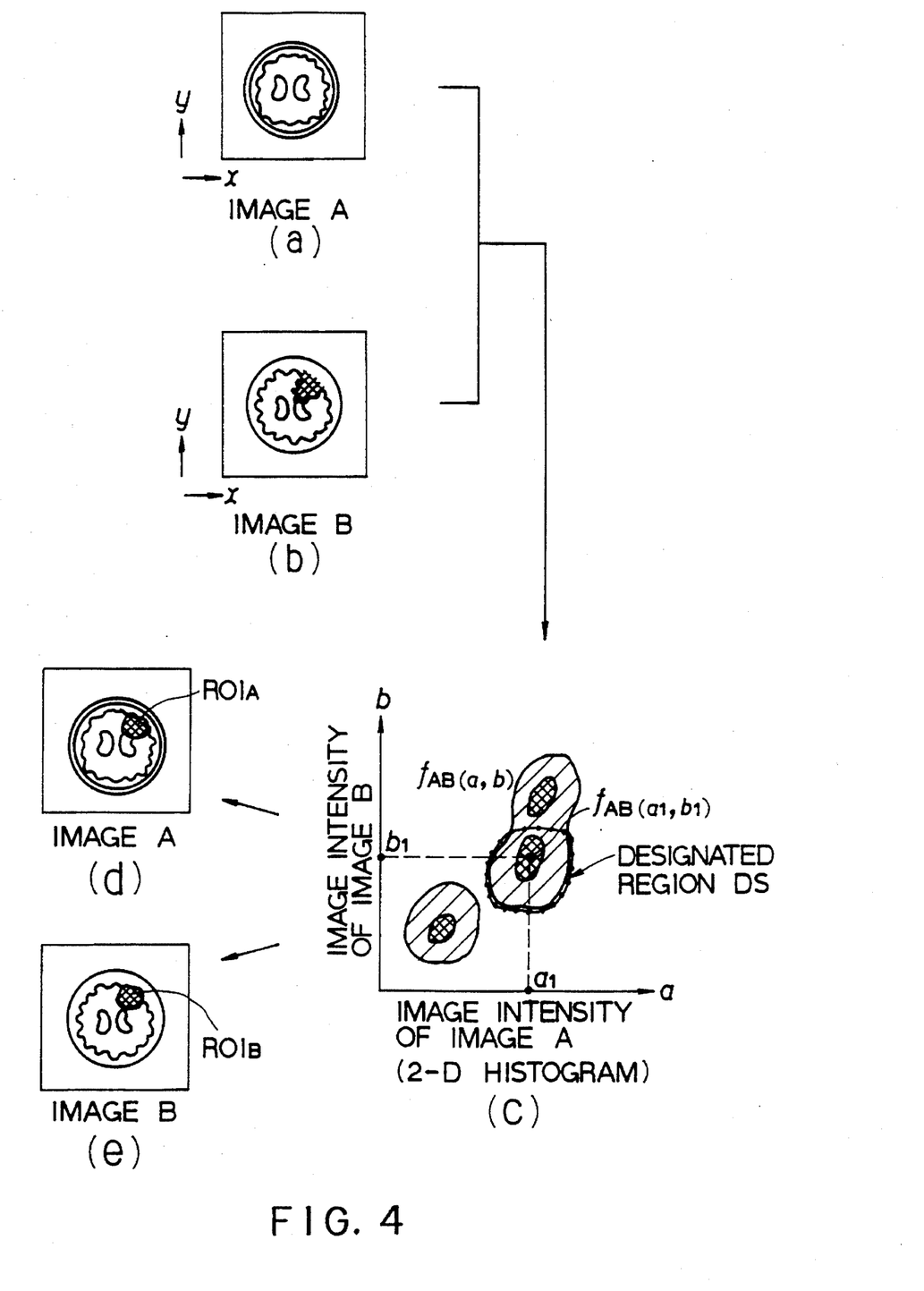
FIG. 4 represents general steps for designating a ROI.

At Step 23, image data of two designated slicing images A and B (refer to (a) and (b) in FIG. 4), corresponding to the image designating signal taken in at Step 21, are read out from the image data store unit 12. After this, at Step 24, just for reference to other image processing, two one-dimensional histograms each consisting of pixel intensities a (b) versus their frequencies $f_A$ ($f_B$) are calculated for each image A (B).

Then, at Step 25, a two-dimensional histogram is calculated based on the data of the two original images A and B read out at Step 23. The two-dimensional histogram is an intensity plane with transverse and longitudinal axes representing pixel intensities a and b of the T1- and T2-weighted images, respectively, as shown in (c) of FIG. 4. In the two-dimensional histogram therein, frequencies depend on changed brightnesses, more precisely, the frequencies increase with increasing degrees of brightness.

The calculation at Step 25 is done as follows. One pixel positioned the same in the images A and B is first picked up for examining respective pixel intensities a and b in the images A and B. The crossing point determined by the pixel intensities a and b is plotted on a two-dimensional coordinate in which transverse and longitudinal axes represent pixel intensities a and b. Then, this plotting is carried out for all the pixels in the images A and B, so that the total number of the plotted points at each position in the coordinate can be counted. Each of the total numbers thus represents the frequency corresponding to the pixel intensities a and b.

Figure 5A:
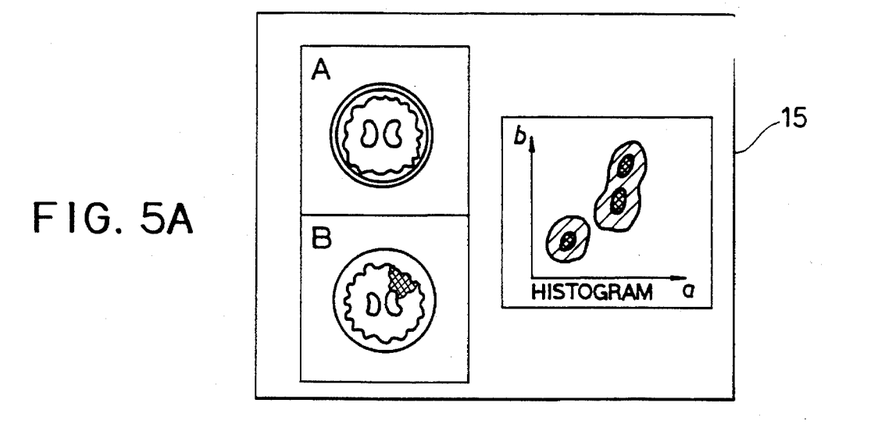
FIGS. 5A to 5C each show conditions of a monitor screen.

After having finished the calculation of the two-dimensional histogram, at Step 26, the image processor 13 initiates a display of the original images A and B and the two-dimensional histogram on the TV monitor 15 in a divided form as shown in FIG. 5A. This display is to be done such that image data, corresponding to the original images A and B and the two-dimensional histogram, stored in a work memory of the image processor 13 are transmitted through the displaying memory 14 and then the interface 17 to the TV monitor 15. The two-dimentional histogram thus-displayed shows how pixel intensities of two original images A and B are distributed on a plane.

Next, it is required that the operator designate a desired region by using the input device 16, while observing the two-dimensional histogram on the TV monitor 15. This desired region can be designated in different methods: for example, first, the closed region of a continuous coordinate group is designated with a coordinate input device such as a mouse; second, a closed region formed by automatically connecting adjacent coordinates among non-continuous coordinate groups is designated with a coordinate input device such as a mouse (the closed region can be interpolated with straight lines or curved lines according to calculation carried out in the image processor 13 or the system controller 11); third, patterns such as circles and rectangles, prestored in a memory, can be set. Moreover, the thus-designated region can be expanded, contracted, rotated, and moved for more adequate and easy designation.

In order to accomplish the above designation of regions, at Step 27, the image processor 13 tries to take in a designating signal supplied by the operator by way of the input device 16. And then at Step 28, the image processor 13 judges whether the designation is over. The procedures at Steps 27 and 28 will be repeated until completing the designation.

If the judgement is YES at Step 28 (i.e., the designation of a desired region has been finished), then processing will go on to Step 29. At Step 29, a region of interest (ROI) corresponding to the designated region at Step 27 is extracted by the following procedures from the data of the original images A and B.

Now let's assume that i is a pixel within the designated region on a two-dimensional histogram, $F_A(i)$ and $F_B(i)$ are arrays of data storing pixel intensities of the designated region on a two-dimensional histogram (that is, the arrays correspond to pixel intensity of original images A and B), (x, y) is a position coordinate of original images A and B, A(x, y) is a pixel intensity of original image A at the position coordinate (x, y), B(x, y) is a pixel intensity of original image B at the position coordinate (x, y), and ROI(x, y) is a data representing a ROI finally extracted, where ROI(x, y)=1 represents the inside of the ROI and ROI(x, y)=0 represents the outside of the ROI.

Figure 3:
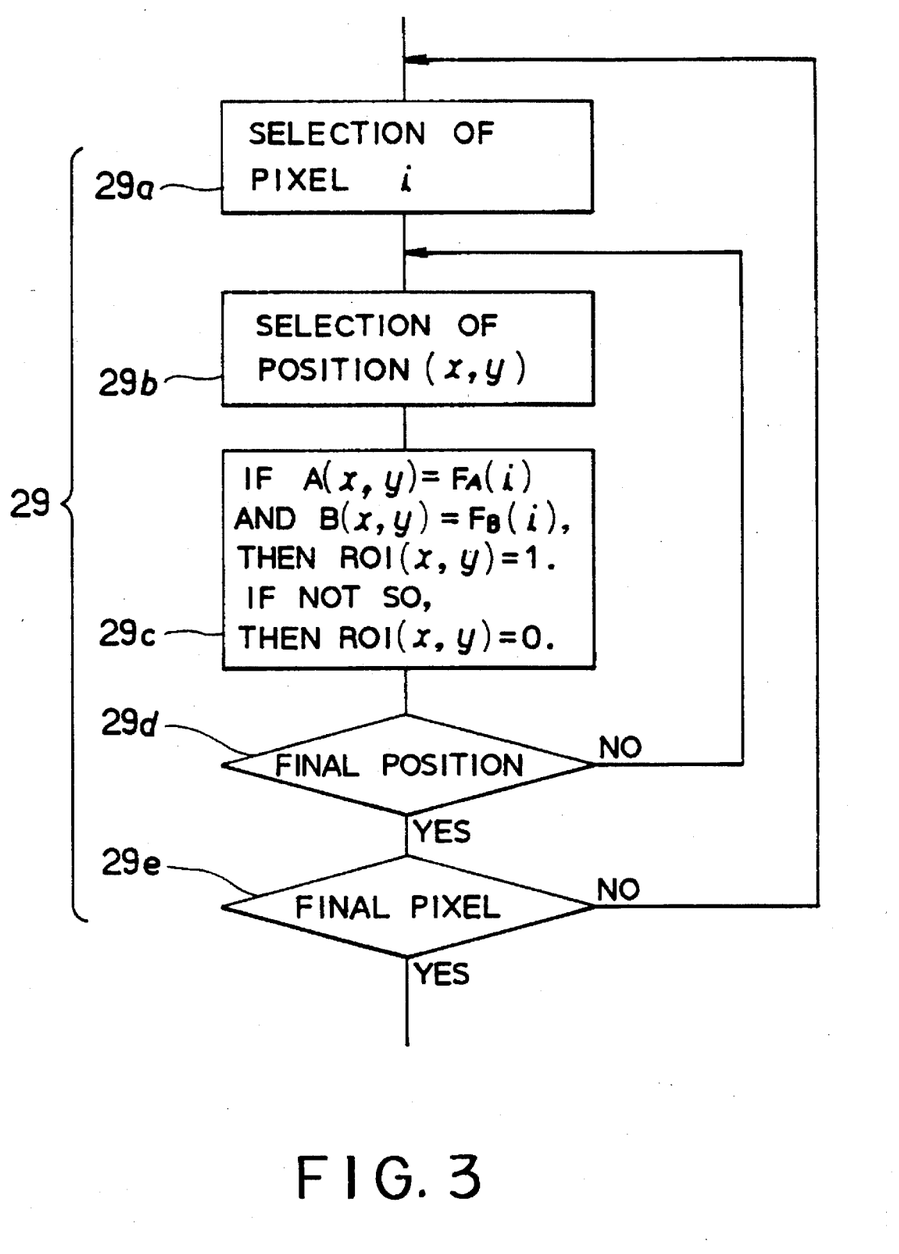
FIG. 3 is a partly shown flowchart of extracting ROI data.

Then, the following procedure is carried out:

1) select a pixel i (refer to Step 29a in FIG. 3), 2) select a position coordinate (x, y) (refer to Step 29b in FIG. 3), 3) with respect to the selected pixel i and the selected position coordinate (x, y), if $A(x, y)=F_A(i)$ and $B(x, y)=F_B(i)$ is concluded, let ROI(x, y) be 1, however if $A(x, y)=F_A(i)$ and $B(x, y)=F_B(i)$ is not concluded, let ROI(x, y) be 0 (refer to Step 29c in FIG. 3), 4) repeat the above-identified procedures 2) and 3) with respect to all position coordinates (x, y) (refer to Step 29d in FIG. 3), and 5) repeat the above-identified procedures 1) to 4) with respect to all pixels i (refer to Step 29e in FIG. 3).

Figure 6A:
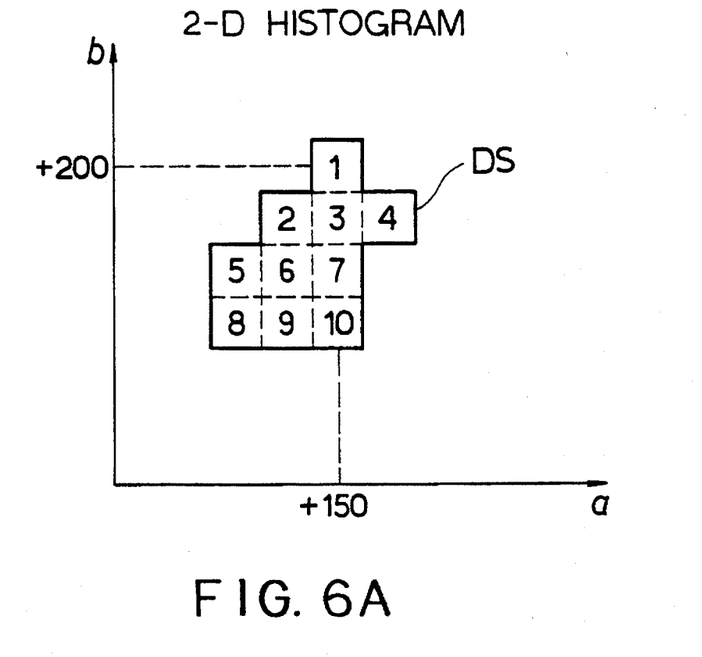
FIGS. 6A and 6B show parts of steps for extracting ROI data.
Figure 6B:
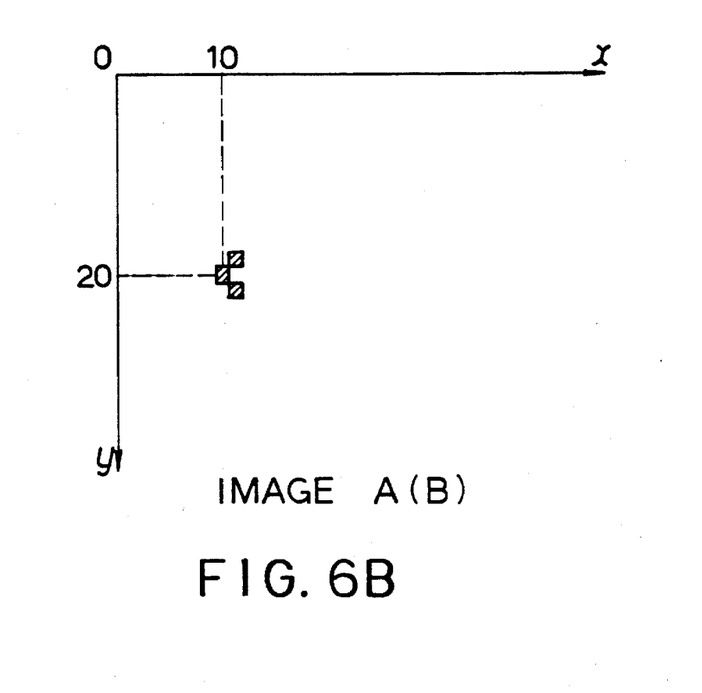

In FIGS. 6A and 6B, an example of the above extraction is shown. Now let's assume that ten pixels exist in total within a designated region DS on the two-dimensional histogram, as depicted in FIG. 6A. For selected i=1, let's assume to be $F_A(1)=+150$ and $F_B(1)=+200$. Hence, pixels having a pixel intensity A(x, y)=a=+150 and a pixel intensity B(x, y)=b=+200 will be examined in the original images A and B. If three positions (x, y)=(10, 20), (11, 19), (11, 21) pictured in FIG. 6B satisfy the above condition "A(x, y)=a=+150 and B(x, y)=b=+200", thus ROI(10, 20)=1, ROI(11, 19)=1, ROI(11, 21)=1. Also the above procedures will be repeated for i=2 to 10.

When the extraction of ROI by above-described procedures has been finished, the processing of Step 30 will be performed. At Step 30, the ROI thus-extracted to be ROI(x, y)=1 is displayed on the TV monitor 15. The display of the ROI, for example, is carried out by increasing the brightness of pixels within the ROI in the original images A and B on the TV monitor 15, as shown in (d) and (e) of FIG. 4. Instead of the brightness change, changing color tone of pixels corresponding to the finally designated ROI on the TV monitor 15 can also be applied to the above display.

At Step 31, the image processor 13 judges whether its processing should come to an end according to a signal from the operator. In case that continuation of the processing is decided, the processing will go on to Step 21.

Figure 7:
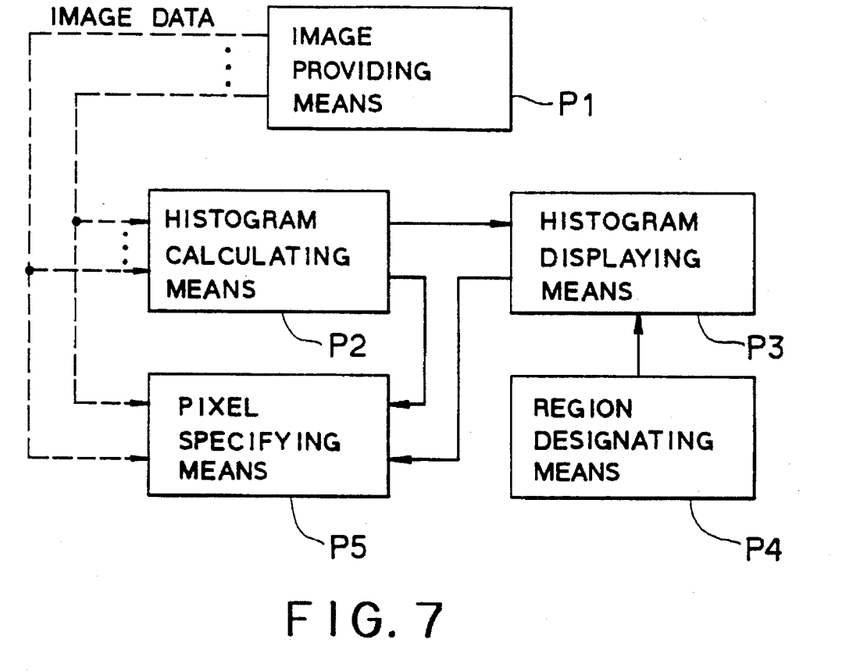
FIG. 7 shows constructional relation of the first embodiment and the present invention.

This embodiment includes the components of the present invention as follows (see FIG. 7). That is, the processes at Steps 21 to 23 in FIG. 2, the input device 16, the interface 18, and the image data store unit 12 forms an image providing means P1 of the present invention. The process at Step 25 in FIG. 2 forms a histogram calculating means P2. The process at Step 26 in FIG. 2, the displaying memory 14, the TV monitor 15, and the interface 17 constitute a histogram displaying means P3. The processes at Steps 27 and 28 in FIG. 2, the input device 16, and the interface 18 forms a region designating means P4. Further, the processes at Steps 29 and 30 in FIG. 2, the displaying memory 14, the TV monitor 15, and the interface 17 corresponds to a pixel specifying means P5 including a pixel determining means.

A summary of this embodiment will now be explained using FIGS. 4 and 5A to 5C. Let's assume that two different original images selected by an operator are like ones shown in FIG. 4(a) and (b). Then one set of histogram data representing a two-dimensional histogram shown in FIG. 4(c) is calculated based on the two original images A and B (refer to Step 25 in FIG. 2). The two original images A and B and two-dimensional histogram are displayed on the TV monitor 15 as shown in FIG. 5A.

Figure 5B:
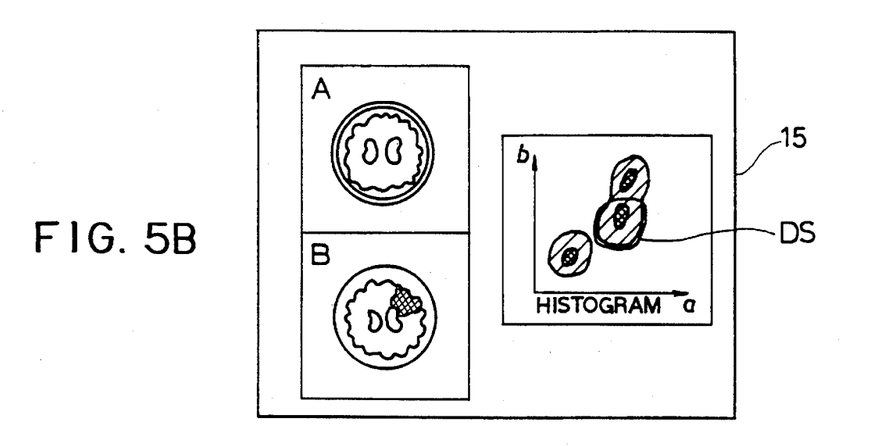

Next, a desired region DS which looks like a lesion will be designated, for example, as shown in FIGS. 4(c) and 5B, by the operator (refer to Steps 27 and 28 in FIG. 2). In response to the designated desired region DS, pixels in each of the two images A and B, having the same pixel intensities a and b as all pixels in the designated region DS, are then selected according to the above-described procedures (refer to Step 29 in FIG. 2). A series of this selection generates two groups of pixels which become ROI(x, y)=1 in the images A and B, hence the two groups of pixels forming two ROIs shown in FIGS. 4(d) and 4(e) when displayed.

Figure 5C:
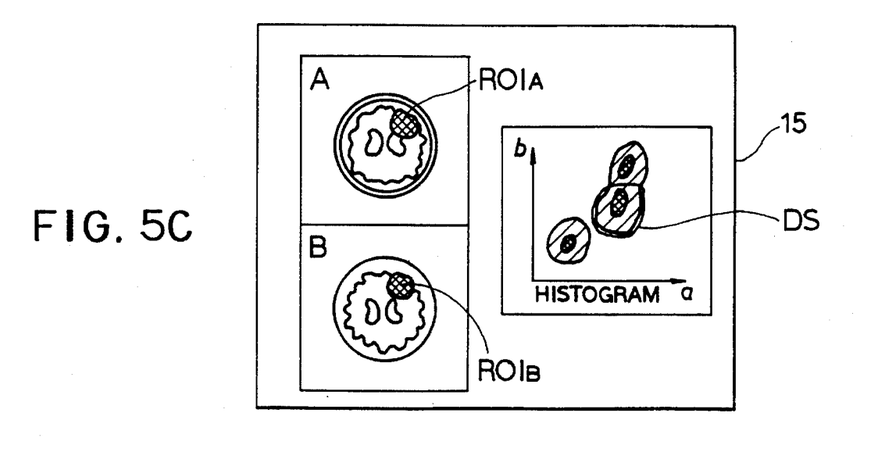

The two ROIs thus-determined are each delineated by superimposing them and by changing their brightness on the original images A and B, like $ROI_A$ and $ROI_B$ shown in FIG. 5C. This delineation permits observers to recognize ROIs easily, and if necessary, the operator can proceed to a new ROI setting or resetting of the ROI.

As having been explained, the finally designated ROIs ($ROI_A$ and $ROI_B$) have more accurate functional information of tissues than that of the prior art, because the final ROIs are determined with correlation analysis between two sets of pixel intensities. In addition, either one of $ROI_A$ or $ROI_B$ may be displayed here.

Figure 8:
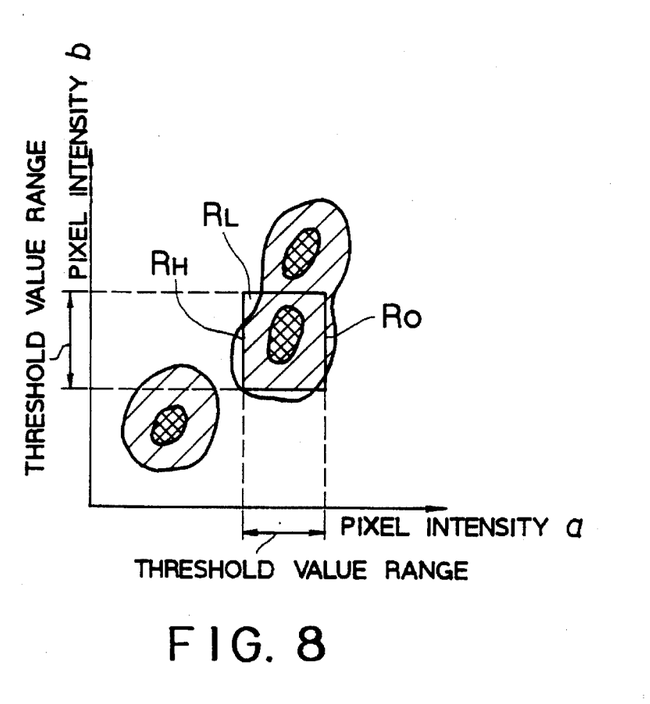
FIG. 8 is a graph explaining a drawback of a conventional ROI technique, if shown in a two-dimensional histogram.

To the contrary, it was almost impossible to collect highly accurate functional information by the prior art. For comparison, FIG. 8 is shown. In FIG. 8, the prior art according to two sets of threshold values and an AND operation refers to only the square area $R_0$ in a two dimensional histogram. This means that the focusing area $R_0$ may include an unwanted pixel region $R_L$ and exclude a wanted pixel region $R_H$ in FIG. 8, reducing accuracy of collecting functional information.

Therefore, the postprocessing technique according to this embodiment enables the delineation or depiction of lesions with higher reliability, which is effective in utilizing the previously introduced techniques, such as an estimate technique according to correlation of pixel intensities and a technique of tissue characterization. It is also possible to contribute to advancement for functional morphology.

In addition, in this embodiment, the operator only has to designate a desired region DS on the two-dimensional histogram, which is a simple operation.

Figure 9:
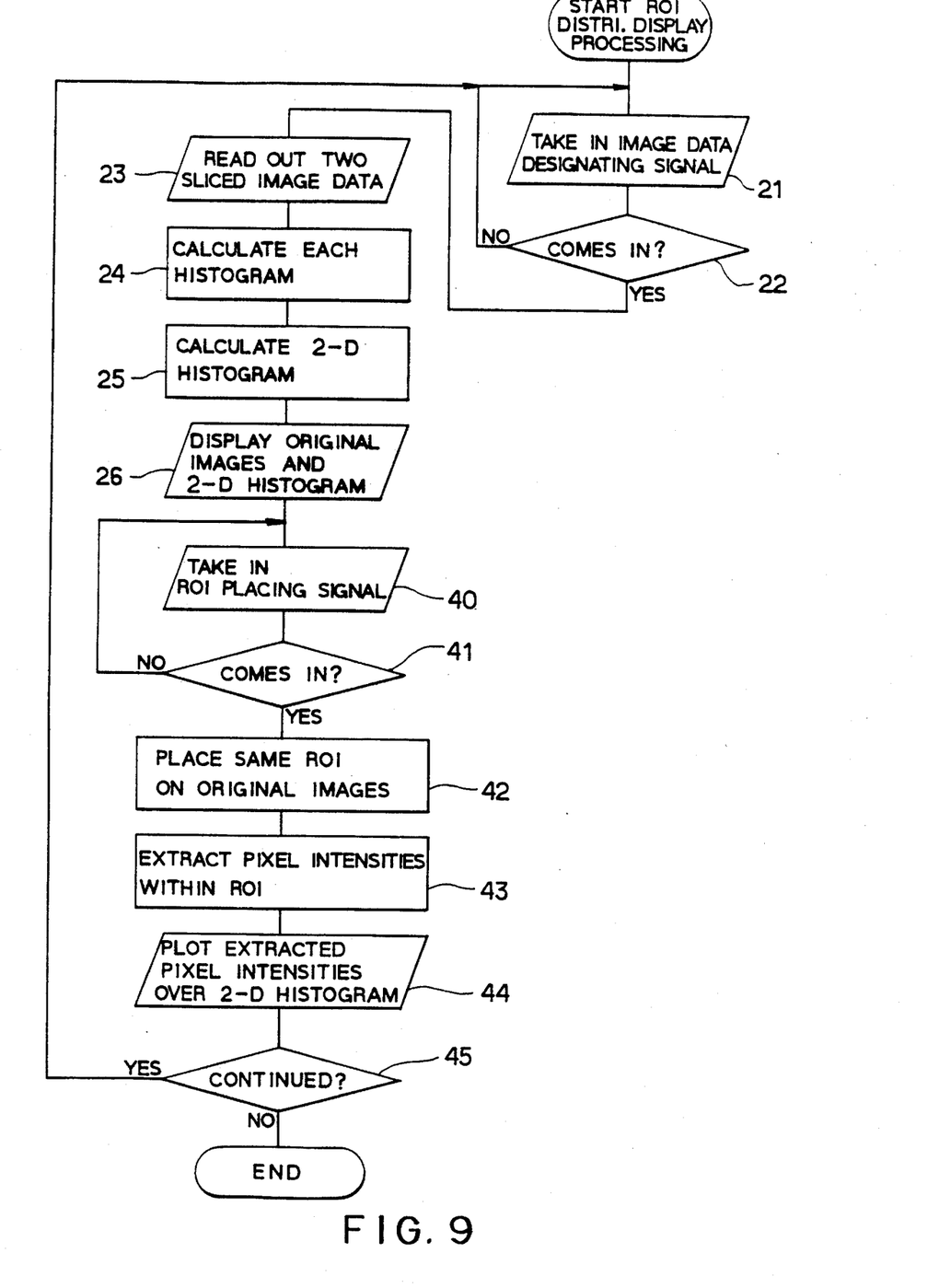
FIG. 9 represents a flowchart of ROI distribution display processing in a second embodiment.
Figure 10A:
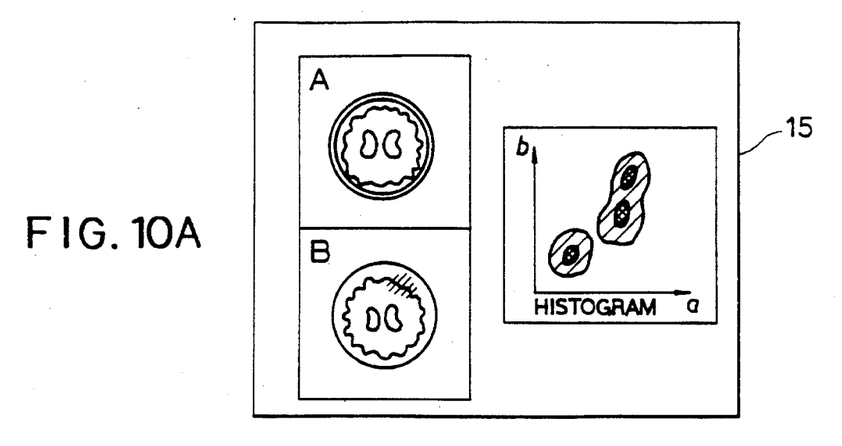
FIGS. 10A to 10C each show conditions of a monitor screen in the second embodiment.
Figure 10B:
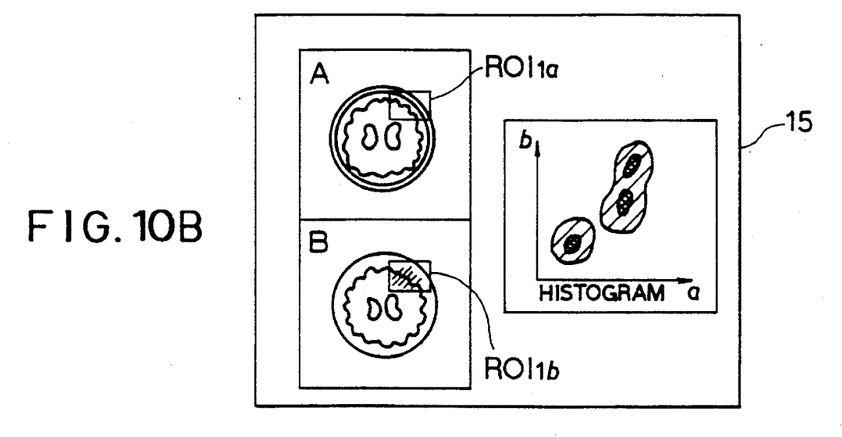
Figure 10C:
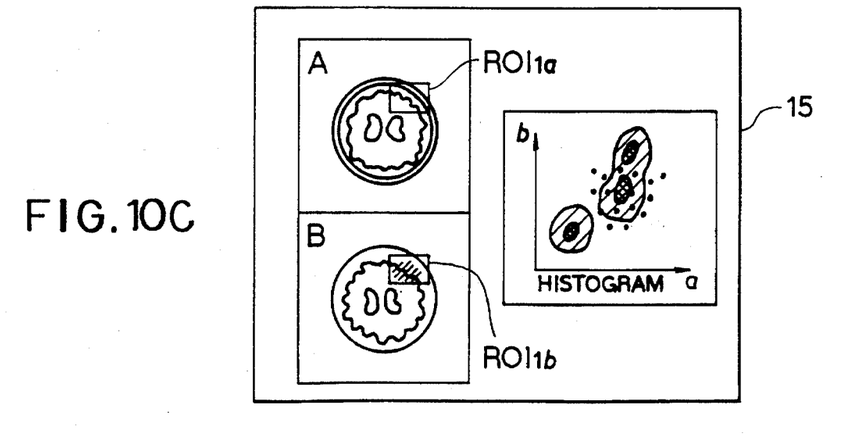
Figure 11:
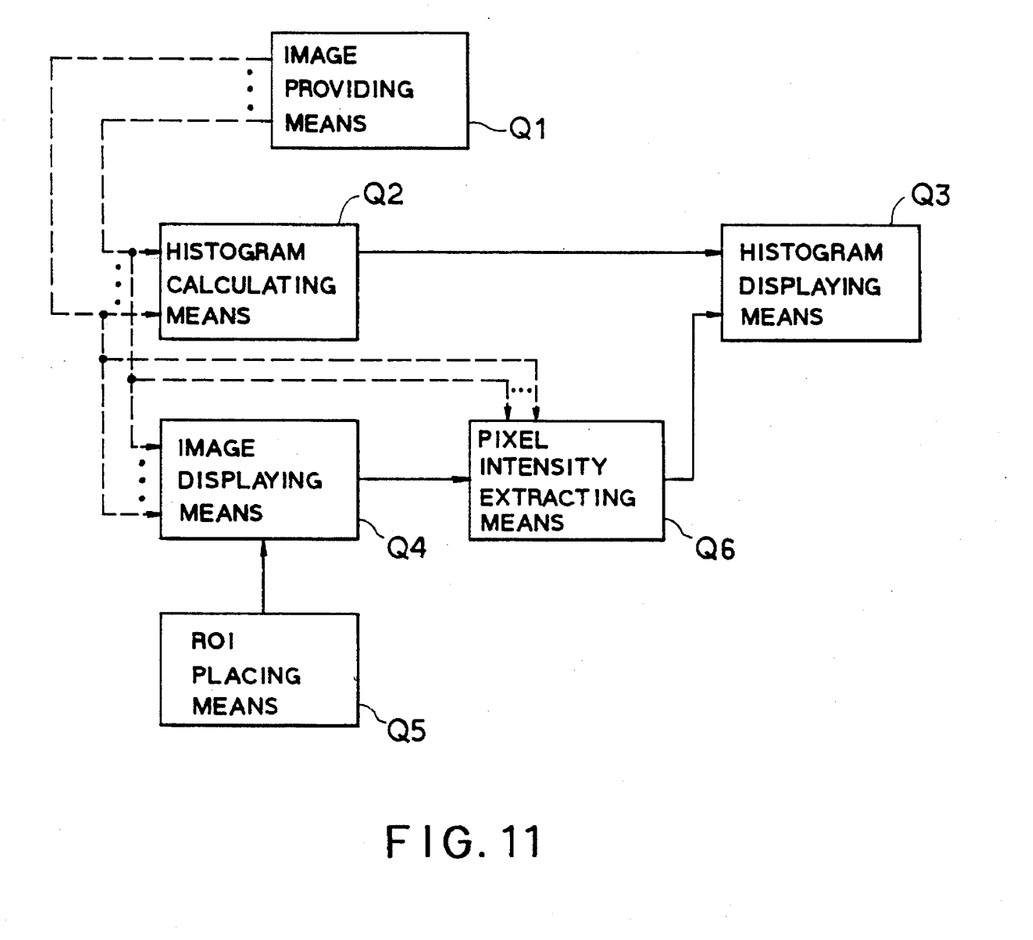
FIG. 11 shows a constructional relation of the second embodiment and the present invention.

Referring now to FIGS. 9, to 11, a second embodiment of the present invention will be explained.

A medical image postprocessing apparatus of the second embodiment is the same in hardware composition as the one of the first embodiment. Thus, the same reference numerals will be used here.

In this second embodiment, the image processor 13 is to carry out a series of procedures shown in FIG. 9. The procedures can provide processing of ROI distribution display.

In FIG. 9, Steps 21 to 26 are the same procedures as the ones shown in FIG. 2. Thus, processing Steps 21 to 26 in FIG. 9 allows the TV monitor 15 to display as shown in FIG. 10A, for example.

Then at Step 40 in FIG. 9, the image processor 13 tries to take in the signal for placing ROIs from an operator. Then at Step 41, whether the ROI placing signal comes in or not is judged. The judgement "YES" thereat permits the processing to go to Steps 42 to 44 in turn.

At Step 42, an identical. ROI is individually placed over an identical coordinate area in the original images A and B, according to the ROI placing signal. As a result, an identical rectangular ROI, for example, is placed each over the images A and B, as ROIs shown in FIG. 10B (refer to two references $ROI_{1a}$ and $ROI_{1b}$). Then, at Step 43, with respect to the common coordinate positions (x, y) within the regions of interest $ROI_{1a}$ and $ROI_{1b}$, the pixel intensities A(x, y)=a and B(x, y)=b in the images A and B are extracted.

Thus, at Step 44, the extracted pixel intensities a . . . a, and b . . . b are plotted with a superimposing technique, as plotted points shown in FIG. 10C. At this processing, the plotted points are displayed color-changed or brightness-changed condition, which results in distinguishing readily the plotted pixel intensities from the two-dimensional histogram.

This embodiment includes the components of the present invention as follows (see FIG. 11). That is, the processes at Steps 21 to 23 in FIG. 9, the input device 16, the interface 18, and the image data store unit 12 forms an image providing means Q1 of the present invention. The process at Step 25 in FIG. 9 forms a histogram calculating means Q2. The processes at Steps 26 and 44 in FIG. 9, the displaying memory 14, the TV monitor 15, and the interface 17 constitute a histogram displaying means Q3. The process at Step 26 in FIG. 9, the displaying memory 14, the TV monitor 15, and the interface 17 constitute an image displaying means Q4. The processes at Steps 40 to 42 in FIG. 9, the input device 16, and the interface 18 form a ROI placing means Q5. Further, the process at Step 43 in FIG. 9 corresponds to a pixel intensity extracting means Q6.

As described above, in this embodiment, ROIs corresponding to a desired region in the first embodiment are placed, and then a distribution of pixel intensities corresponding to a finally designated ROI in the first embodiment comes up, which is an opposite way to the first embodiment. Hence, this second embodiment can provide complementary usage to the ROI-designation in the first embodiment.

That is, because the operator can easily see and recognize how the pixel intensities distribute over the intensity plane like in FIG. 10C, the operator can imagine how a region should be designated on the intensity plane (two-dimensional histogram). Thus, in such a case when it would be difficult to designate a distribution region of pixel intensities over the two-dimensional histogram (e.g., one cannot imagine the distribution region of pixel intensities because of inexperience), the distribution of pixel intensities in FIG. 10C gives a great help to designate a region over the two-dimensional histogram, therefore facilitating ROI designation in the first embodiment.

In addition, there can be provided usage in which distribution patterns of pixel intensities for past cases can be superimposed over the two-dimensional histogram, thus making ROI designation or ROI placement more accurate.

What we claim is:

1. An apparatus for postprocessing medical images comprising:

means for providing a plurality of medical images imaged at an identical position of an object being imaged under different imaging conditions, each of said images extending two-dimensionally and consisting of a plurality of pixels each having a pixel intensity;

means for calculating a histogram with more than one dimension representing correlation between pixel intensities of said plurality of images and frequencies of the pixel intensities, each of said dimensions being assigned to an axis showing the pixel intensities of each of the plurality of medical images and said frequencies being obtained at coordinate positions defined by the plurality of axes;

means for displaying said histogram, differences in the frequencies being expressed as differences in frequency-display information within a coordinate region defined by the displayed histogram;

means for directly designating a desired region on the histogram displayed by said displaying means, the desired region being of arbitrary shape; and means for determining which pixels in said plurality of medical images correspond in pixel intensity to the desired region designated on the histogram.

2. The apparatus as claimed in claim 1, wherein said plurality of medical images are composed of two medical images and said histogram calculating means is a means that calculates a two-dimensional histogram as the histogram with more than one dimension on the basis of the two medical images, said two-dimensional histogram having two axes each representing the pixel intensities of each of the two medical images, said two axes being perpendicular to each other.

3. The apparatus as claimed in claim 2, wherein said frequency-displaying information is a brightness level.

4. The apparatus as claimed in claim 1, wherein said designating means includes an input device to manually designate the desired region on the histogram.

5. An apparatus for postprocessing medical images comprising:

means for providing a plurality of medical images imaged at an identical position of an object being imaged under different imaging conditions, each of said image extending two-dimensionally and consisting of a plurality of pixels each having a pixel intensity;

means for calculating a histogram with more than one dimension representing correlation between pixel intensities of said plurality of images and frequencies of the pixel intensities, each of said dimensions being assigned to an axis showing the pixel intensities of each of the plurality of medical images and said frequencies being obtained at coordinate positions defined by the plurality of axes, first means for displaying said plurality of images;

second means for displaying said histogram, differences in the frequencies being expressed as differences in frequency-displaying information within a coordinate region defined by the displayed histogram;

means for placing an identical region of interest (ROI) over said plurality of images displayed by said first displaying means;

means for extracting a plurality of sets of pixel intensities for common image coordinates of the regions of interest placed by said ROI placing means; and third means for displaying said plurality of sets of pixel intensities superimposed on the histogram displayed by the second displaying means.

6. The apparatus as claimed in claim 5, wherein said plurality of medical images are composed of two medical images and said histogram calculating means is a means that calculates a two-dimensional histogram as the histogram with more than one dimension on the basis of the two medical images, said two-dimensional histogram having two axes each representing the pixel intensities of each of the two medical images, said two axes being perpendicular to each other.

7. The apparatus as claimed in claim 6, wherein said frequency-displaying information is a brightness level.

8. The apparatus as claimed in claim 7, wherein said first and second displaying means have in common one TV monitor to display two medical images and the two-dimensional histogram in divided form on the TV monitor.

9. The apparatus as claimed in claim 8, wherein said third displaying means comprises a mechanism for changing either one of brightness and color tone of the superimposed pixels of the two-dimensional histogram displayed by the second displaying means.

10. A method of postprocessing medical-images comprising steps of:

providing a plurality of medical images imaged at an identical position of an object being imaged under different imaging conditions, each of said images extending two-dimensionally and consisting of a plurality of pixels each having a pixel intensity;

calculating a histogram with more than one dimension representing correlation between pixel intensities of said plurality of images and frequencies of the pixel intensities, each of said dimensions being assigned to an axis showing the pixel intensities of each of the plurality of medical images and said frequencies being obtained at coordinate positions defined by the plurality of axes;

displaying the plurality of medical images;

displaying said histogram, differences in the frequencies being expressed as differences in frequency-displaying information within a coordinate region by the displayed histogram;

directly designating a desired region on the histogram displayed, the desired region being of arbitrary shape; and determining which pixels in said plurality of medical images correspond in the pixel intensity to the desired region designated on the histogram.

11. The method as claimed in claim 10, wherein said plurality of medical images are composed of two medical images and said histogram calculating step calculates a two-dimensional histogram as the histogram with more than one dimension on the basis of the two medical images, said two-dimensional histogram having two axes each representing the pixel intensities of each of the two medical images, said two axes being perpendicular to each other.

12. The method as claimed in claim 11, wherein said frequency-displaying information is a brightness level.

13. An apparatus for postprocessing medical images comprising:

means for providing a plurality of medical images imaged at an identical position of an object being imaged under different imaging conditions, each of said images extending two-dimensionally and consisting of a plurality of pixels each having a pixel intensity;

means for calculating a histogram with more than one dimension representing correlation between pixel intensities of said plurality of images and frequencies of the pixel intensities, each of said dimensions being assigned to an axis showing the pixel intensities of each of the plurality of medical images and said frequencies being obtained at coordinate positions defined by the plurality of axes;

first means for displaying said plurality of medical images;

second means for displaying said histogram, differences in the frequencies being expressed as differences in frequency-displaying information within a coordinate region defined by the displayed histogram;

means for directly designating a desired region on the histogram displayed by said displaying means, the desired region being of arbitrary shape;

means for determining which pixels in said plurality of medical images correspond in pixel intensity to the desired region designated on the histogram; and third means for displaying the pixels determined by the determining means.

14. The apparatus as claimed in claim 13, wherein said plurality of medical images are composed of two medical images and said histogram calculating means is a means that calculates a two-dimensional histogram as the histogram with more than one dimension on the basis of the two medical images, said two-dimensional histogram having two axes each representing the pixel intensities of each of the two medical images, said two axes being perpendicular to each other.

15. The apparatus as claimed in claim 13, wherein said designating means includes an input device to manually designate the desired region on the histogram.

16. The apparatus as claimed in claim 14, wherein said frequency-displaying information is a brightness level.

17. The apparatus as claimed in claim 16, wherein said image providing means has an image data store unit storing data of the medical images.

18. The apparatus as claimed in claim 17, wherein said data stored in the image data store unit is data of magnetic resonance imaging.

19. The apparatus as claimed in claim 18, wherein said two medical images are T1- and T2-weighted images.

20. The apparatus as claimed in claim 18, wherein said two medical images are a T1-weighted image and a proton density-weighted image.

21. The apparatus as claimed in claim 18, wherein said two medical images are a T2-weighted image and a proton density-weighted image.

22. The apparatus as claimed in claim 17, wherein said data stored in the image data store unit are data of X-ray computed tomography.

23. The apparatus as claimed in claim 22, wherein said two medical images are images with and without contrast medium, respectively.

24. The apparatus as claimed in claim 17, wherein said data stored in the image data store unit are data of single-photon emission computed tomography.

25. The apparatus as claimed in claim 24, wherein said two medical images are images with different contrast media.

26. The apparatus as claimed in claim 17, wherein said designating means has a means for placing a closed region, as the desired region, surrounded by a group of continuous coordinates.

27. The apparatus as claimed in claim 17, wherein said designating means has a means for placing a closed region, as the desired region, formed by connecting adjacent coordinates of a group of non-continuous coordinates.

28. The apparatus as claimed in claim 17, wherein said designating means has a means for placing a closed region, as the desired region, consisting of a predetermined closed pattern including a polygon and a circle.

29. The apparatus as claimed in claim 16, wherein said pixel determining means comprises a means for selecting one pixel within the designated region on the two-dimensional histogram, a means for selecting one position in the two medical images, a means for comparing the pixel intensities between the selected pixel of the designated region and the selected position of the two medical images, a means for determining positions in at least one of the two medical images, the positions having same pixel intensities as the selected pixel, and a means for repeating comparison carried out by the comparing means and determination carried out by the determining means for all the positions selected by the position selecting means and all the pixels selected by the pixel selecting means.

30. The apparatus as claimed in claim 29, wherein said third displaying means comprises a unit for displaying the determined pixels as two regions of interest each superimposed on the two medical images displayed on the first displaying means.

31. The apparatus as claimed in claim 30, wherein said first and second displaying means have in common one TV monitor to display the two medical images and two-dimensional histogram in divided form on the TV monitor.

32. The apparatus as claimed in claim 31, wherein said third displaying means comprises a mechanism for changing either one of brightness and color tone of the determined pixels on each of the two medical images displayed on the first displaying means.

33. A method of postprocessing medical images comprising steps of:

provinding a plurality of medical images imaged at an identical position of an object being imaged under different imaging conditions, each of said images extending two-dimensionally and consisting of a plurality of pixels each having a pixel intensity;

calculating a histogram with more than one dimension representing correlation between pixel intensities of the plurality of images and frequencies of the pixel intensities, each of said dimensions being assigned to an axis showing the pixel intensities of each of the plurality of medical images and said frequencies being obtained at coordinate positions defined by the plurality of axes;

displaying the plurality of medical images;

displaying the histogram, differences in the frequencies being expressed as differences in frequency-displaying information within a coordinate region by the displayed histogram;

directly designating a desired region on the histogram displayed, the desired region being arbitrary in shape;

determining which pixels in the plurality of medical images correspond in pixel intensity to the desired region on the histogram; and displaying the determined pixels on the plurality of medical images, respectively.

34. The method as claimed in claim 33, wherein said plurality of medical images are composed of two medical images and said histogram calculating step calculates a two-dimensional histogram as the histogram with more than one dimension on the basis of the two medical images, said two-dimensional histogram having two axes each representing the pixel intensities of each of the two medical images, said two axes being perpendicular to each other.

35. The method as claimed in claim 34, wherein said frequency-displaying information is a brightness level.

* * * * *